(12) United States Patent
Galvan

(10) Patent No.: US 9,276,453 B2
(45) Date of Patent: Mar. 1, 2016

(54) ELECTRICAL SYSTEM AND METHOD FOR SUSTAINING AN EXTERNAL LOAD

(71) Applicant: Mario A. Galvan, St. Cloud, FL (US)

(72) Inventor: Mario A. Galvan, St. Cloud, FL (US)

(*) Notice: Subject to any disclaimer, the term of this patent is extended or adjusted under 35 U.S.C. 154(b) by 0 days.

(21) Appl. No.: 14/493,960

(22) Filed: Sep. 23, 2014

(65) Prior Publication Data

US 2015/0042193 A1   Feb. 12, 2015

Related U.S. Application Data

(63) Continuation of application No. 13/075,414, filed on Mar. 30, 2011, now Pat. No. 8,872,403.

(60) Provisional application No. 61/421,896, filed on Dec. 10, 2010.

(51) Int. Cl.
| | | |
|---|---|---|
| *H02K 16/00* | (2006.01) | |
| *H02K 16/02* | (2006.01) | |
| *H02K 16/04* | (2006.01) | |
| *H02K 53/00* | (2006.01) | |
| *H02K 47/04* | (2006.01) | |

(52) U.S. Cl.
CPC .............. *H02K 16/025* (2013.01); *H02K 16/00* (2013.01); *H02K 16/04* (2013.01); *H02K 47/04* (2013.01); *H02K 53/00* (2013.01); *Y10S 74/09* (2013.01)

(58) Field of Classification Search
CPC ...... H02K 16/025; H02K 16/00; H02K 16/04
USPC .................................................. 310/112–114
IPC .............................. H02K 16/025,16/00, 16/04
See application file for complete search history.

(56) References Cited

U.S. PATENT DOCUMENTS

| | | | |
|---|---|---|---|
| 2,376,421 | A | 5/1945 | Forrest |
| 4,233,858 | A | 11/1980 | Rowlett |
| 4,405,028 | A | 9/1983 | Price |
| 4,625,160 | A | 11/1986 | Hucker |
| 4,967,097 | A | 10/1990 | Mehl |
| 5,089,734 | A | 2/1992 | Bickraj |
| 5,917,248 | A * | 6/1999 | Seguchi et al. .................. 290/31 |
| 6,147,415 | A * | 11/2000 | Fukada ........................... 290/55 |
| 6,157,147 | A | 12/2000 | Lin |
| 6,239,513 | B1 | 5/2001 | Dean et al. |
| 6,380,653 | B1 * | 4/2002 | Seguchi ........................ 310/112 |
| 6,998,723 | B2 | 2/2006 | Kong et al. |
| 7,019,412 | B2 | 3/2006 | Ruggieri et al. |
| 7,157,875 | B2 | 1/2007 | Kamen et al. |
| 7,262,533 | B2 | 8/2007 | Fiset |

(Continued)

*Primary Examiner* — Dang Le
(74) *Attorney, Agent, or Firm* — Terry M. Sanks, Esq.; Beusse Wolter Sanks & Maire, PLLC

(57) ABSTRACT

An electrical power system is disclosed including a first magnetic power generator and a second magnetic power generator wherein the first magnetic power generator is positioned within the second magnetic power generator. Also disclosed is an electrical power system including a first core having a first magnet rotor and a first stator and a second core having a second magnet rotor and a second stator with the first core positioned within the second core. The first magnet rotor is capable of operating in either an opposite rotational direction or a same rotational direction as the second magnet rotor.

20 Claims, 9 Drawing Sheets

(56) References Cited

U.S. PATENT DOCUMENTS

| | | |
|---|---|---|
| 7,274,124 B2 | 9/2007 | Fahy |
| 7,994,673 B2 | 8/2011 | Sorida |
| 8,872,403 B2 * | 10/2014 | Galvan ................ 310/113 |
| 2005/0173996 A1 | 8/2005 | Ellison |
| 2008/0054827 A1 | 3/2008 | States et al. |
| 2008/0197730 A1 * | 8/2008 | Himmelmann et al. ........ 310/83 |
| 2009/0072645 A1 * | 3/2009 | Quere .................. 310/114 |
| 2009/0079393 A1 | 3/2009 | Teca |

\* cited by examiner

ELECTRICAL SYSTEM AND METHOD FOR SUSTAINING AN EXTERNAL LOAD

CROSS-REFERENCE TO RELATED APPLICATIONS

This application is a Continuation of U.S. application Ser. No. 13/075,414 filed Mar. 30, 2011, which claims the benefit of U.S. Provisional Application No. 61/421,896 tiled Dec. 10, 2010, and incorporated herein by reference in its entirety.

BACKGROUND OF THE INVENTION

Exemplary embodiments of the invention relate generally to a power supply and, more specifically, to a system and method for sustaining an external load with minimum external power.

With the continued rise in cost of fuel or energy sources, a need for more affordable fuel or energy sources is desired. Some more affordable fuel sources, such as solar power and wind power, have several built-in limitations. For example, both solar power and wind power require physical space for solar arrays or wind turbines. Thus, an individual residing in a home, condominium, or apartment may be limited on an ability to use such power sources. Another emerging power source is nuclear. However, nuclear power is not a technology that is readily available to an individual as only electric companies have an ability to satisfy government regulations to produce a nuclear power plant. Further, individuals would not require a power plant, but just a simple unit that could be used individually.

Thus, in view of the limitations recognized with other power sources, individuals would benefit from having an ability to provide sustainable power to a load while minimizing an amount of external power needed to sustain the load.

BRIEF DESCRIPTION OF THE INVENTION

Exemplary embodiments of the invention are directed to a system, specifically an electrical system that may be used for sustaining an external load. The system comprises a first magnetic power generator and a second magnetic power generator wherein the first magnetic power generator is positioned within the second magnetic power generator.

Another system comprises a first core comprising a first magnet rotor and a first stator and a second core comprising a second magnet rotor and a second stator with the first core positioned within the second core. The first magnet rotor is capable of operating in either an opposite rotational direction or a same rotational direction as the second magnet rotor.

DETAILED DESCRIPTION OF THE INVENTION

Figure 1:
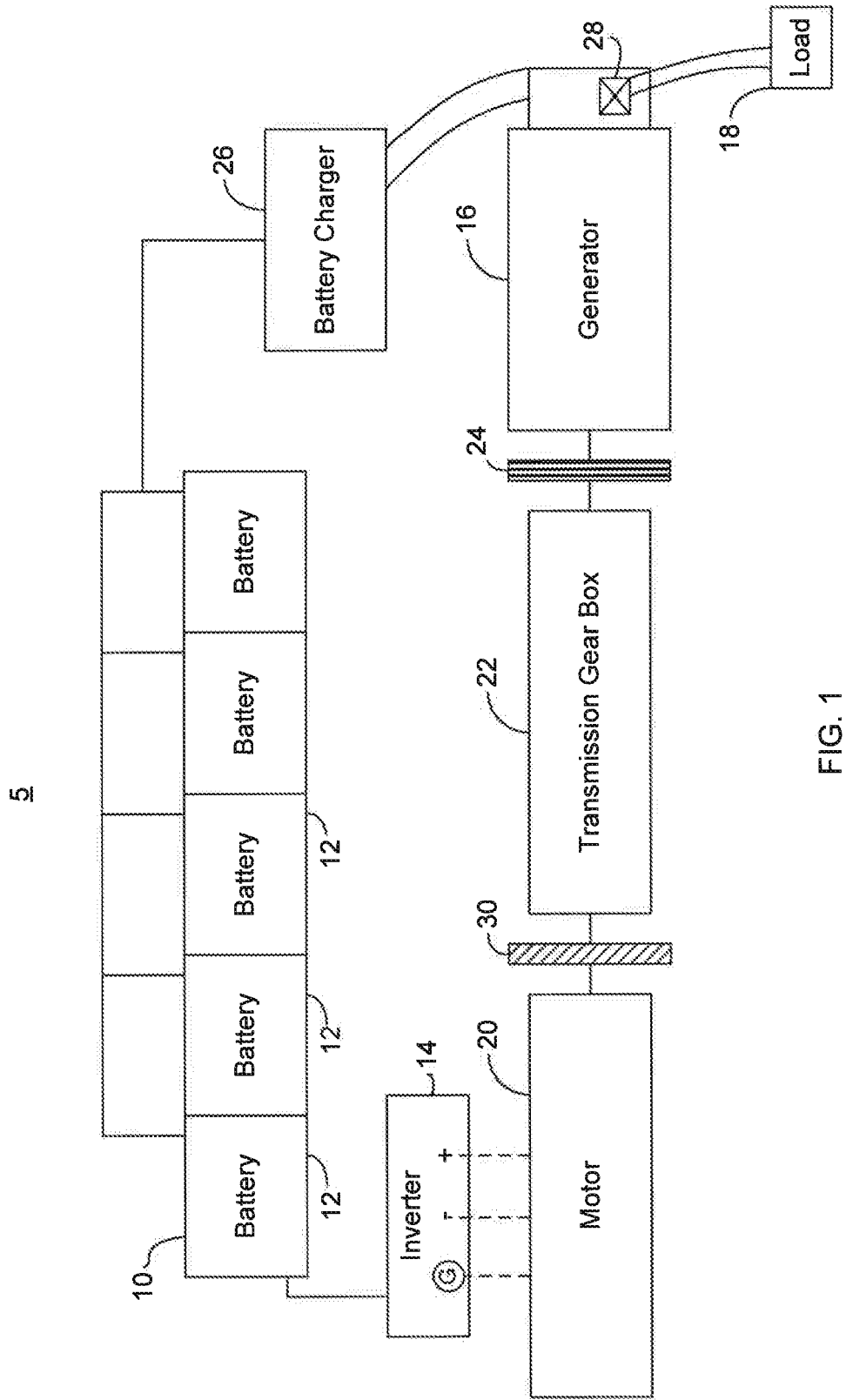
FIG. 1 discloses a block diagram of a self-generating electrical power system capable of sustaining a load.

Reference will now be made in detail to the embodiments consistent with the invention, examples of which are illustrated in the accompanying drawings. Wherever possible, the same reference numerals used throughout the drawings refer to the same or like parts. The scope of the invention disclosed is applicable to a plurality of uses, a few of which are disclosed below.

FIG. 1 discloses a block diagram of a self generating electrical power system 5 capable of sustaining a load. As illustrated, a bank 10 of rechargeable batteries 12 is provided, though depending on the battery technology and the function of the system 5, only one battery 12 may be used. The type of battery 12 is not limiting. For example, the battery may be lithium ion cells or a twelve (12) volt battery 12. The batteries 12 provide power to an inverter 14. The batteries 12 are primarily used to start the system 5, more specifically, the generator 16, and also to provide additional power, such as a boost, if additional power is needed for peak performance by the system 5 or a load 18 connected to the system 5. The inverter 14 converts power from the batteries 12 for use by a motor 20, such as an electric motor. The motor 20 turns a torque conversion system 22. For example, the torque conversion system 22, or torque transmission system, may comprise a transmission gear box and/or chain drive which turns an inertia, torque, wheel, or weight 24. The torque conversion system 22 then operates the generator 16. The gear ratio for the torque conversion system 22 is determined by the revolutions per minute produced by the motor 20. Thus, the ratio is not necessarily a constant ratio. The generator 16 provides electrical power to a battery charger 26 to recharge the batteries 12, and includes an outlet 28 to provide electricity to the load 18, typically an external load. A cooling system 30 is also provided to cool the motor 20, namely, as to maintain the motor 20 at an acceptable operating temperature.

In more detail, an exemplary illustration of the system may include 12 volt batteries wired to the inverter 14. The inverter 14 provides power to a 120 volt electric motor 20 where the motor 20 operates at 1,740 revolutions per minute (RPM). The motor 20 turns a transmission gear box 22, or chain drive, at a 2.069 ratio which turns a torque wheel 24, which operates a 240 volt generator 16 at 3600 RPM. Power is provided to a 12 volt battery charger 26 and at least one outlet 28 is provided for use by the external load 18. The battery charger electrical output is determined by the battery amperage and the size of the motor 20.

Figure 2:
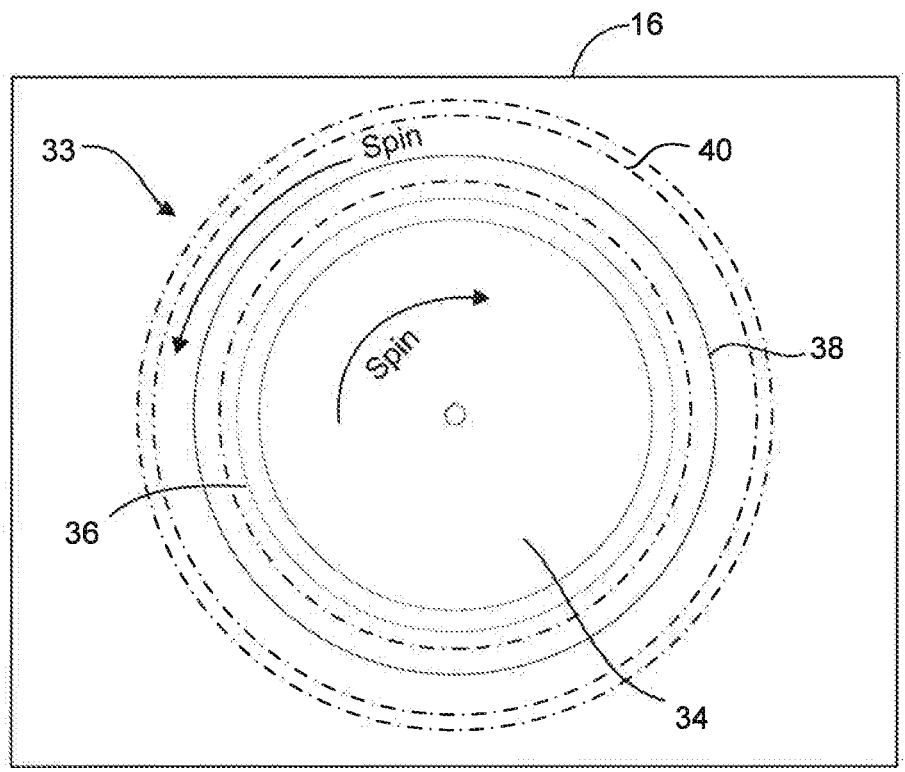
FIG. 2 discloses a diagram of an inside view of the generator depicting a dual core generator.

FIG. 2 discloses a diagram illustrating a front inside view of the generator depicting a dual core generator. The generator 16 comprises a dual core generator 33. As illustrated, a first core is located within a second core. More specifically, a first magnet rotor 34 is provided that spins in a first direction, such as clockwise. A first multi-winding stator 36 surrounds the inner magnet rotor 34. The first magnet rotor 34 and the first multi-winding stator 36 comprise the first core. A second magnet rotor 38 surrounds the first multi-winding stator 36, and spins in an opposite direction of the first magnet rotor 34, in this example, counter-clockwise. A second multi-winding stator 40 surrounds the second magnet rotor 38. The second magnet rotor 38 and the second multi-winding stator 40 comprise the second core.

Figure 3:
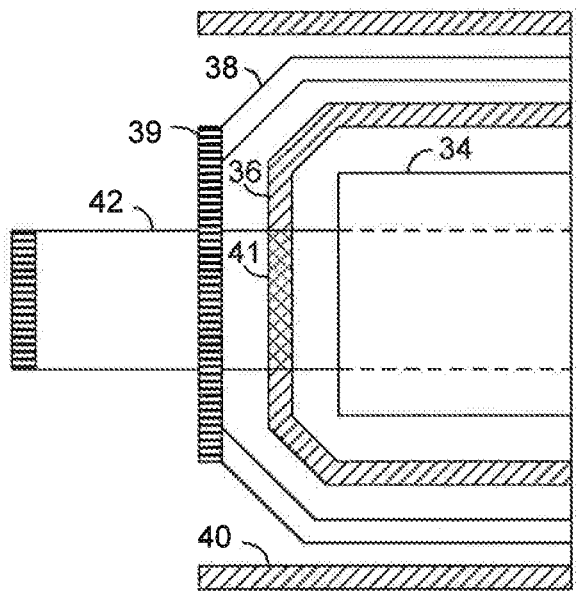
FIG. 3 discloses a side view of a front end of another exemplary embodiment of the dual core generator.

FIG. 3 discloses a side view of a front end of another exemplary embodiment of the dual core generator. The first magnet rotor 34 is on a main shaft 42, and rides on, or rotates based on, free spinning bearings 41. The second magnet rotor 38 rides on bearings with a gear/sprocket 39. The gear/sprocket 39 may be located on the front or back of the dual core generator 33. When the shaft 42 spins in one direction the rear gear/sprocket is configured to turn the second magnet rotor 38 in an opposite direction, such as with use of a chain drive (not shown). When this spin is created, the first magnet rotor 34 riding on the bearings 41 is held in place by the opposite spin of the second magnet rotor 38.

Figure 4:
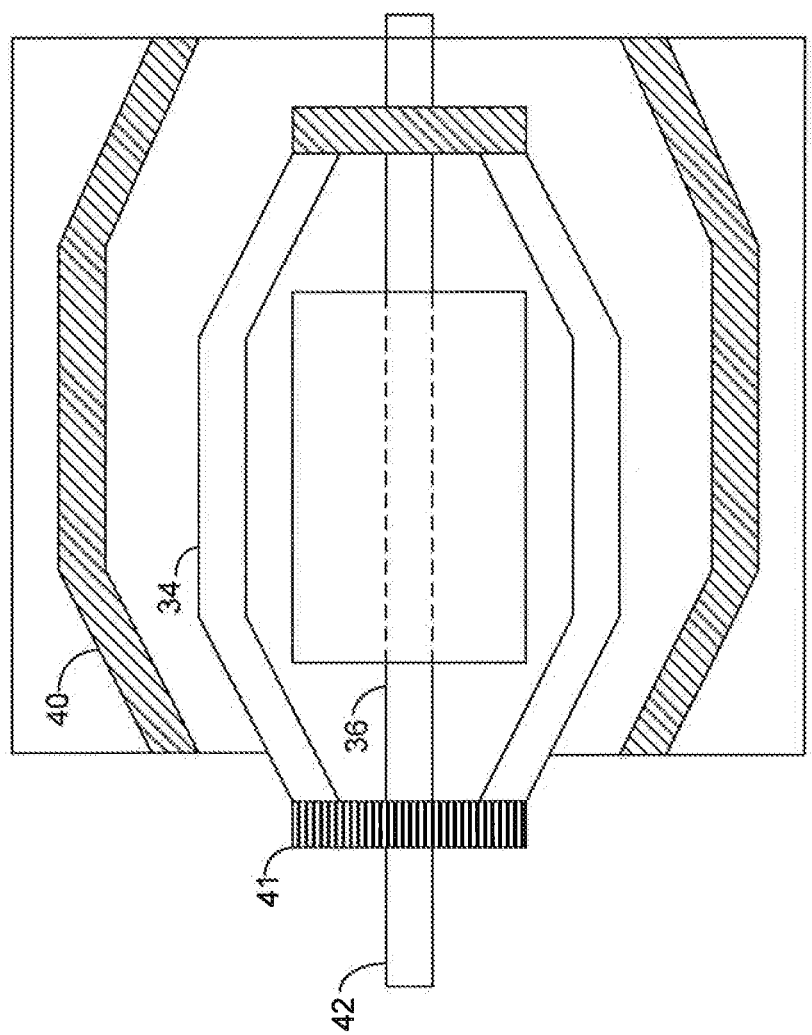
FIG. 4 discloses a side view of another embodiment of the dual core generator.

FIG. 4 discloses a side view of another embodiment of the dual core generator. As illustrated, a signal magnet 34 is located in between the first multi-winding stator 36 and the second multi-winding stator 40. The magnet 34 is connected to the shaft 42 with bearings 41. The magnet 34 rotates in between the two stators 36, 40.

In another exemplary embodiment, the first magnet rotor 34 may be configured to spin whereas the second magnet rotor 38 is configured to remain stationary. In yet other embodiment, either the first multi-winding stator 36 is configured to spin while the second multi-winding stator 40 remains stationary or the first multi-winding stator 36 remains stationary when the second multi-winding stator 40 spins. Additionally, in another exemplary embodiment, when a free riding stator is utilized, the bearings 41 may be or include a clutch mechanism, so that when clutch mechanism is configured to hold the stator stationary if operation of the generator requires it to remain stationary.

Figure 5:
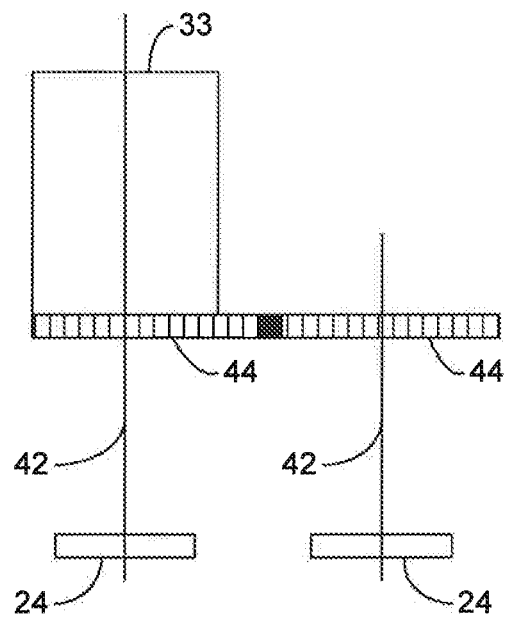
FIG. 5 discloses a top view of an internal configuration of the generator.
Figure 6:
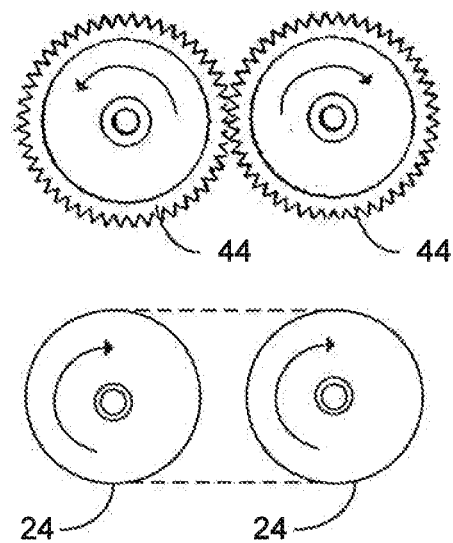
FIG. 6 discloses a front view of gears operating the generator in combination with gears from transmission gear system.

FIG. 5 discloses a top view of an exemplary embodiment of the generator 16, and FIG. 6 discloses a front view of gears operating the generator in combination with gears from transmission gear system 22. The gears 24 from the transmission gear system 22 are connected via a first shaft 42 and a second shaft 43 to a set of gears 44 in communication with the dual core generator 33. The set of gears 44 rotate in an opposite direction from each other and each respective gear 44 control the rotation a respective one of the magnet rotors 34, 38, as explained above, wherein the gear operating opposite the gears 24 is able to operate opposite because of a bearing/gear/sprocket arrangement.

In another exemplary embodiment, the first core is not surrounded by the second core of the dual core generator, but both cores are still configured with the each respective magnet rotor 34, 38 operating in an opposite direction from the other magnet rotor 34, 38. In another exemplary embodiment, the magnet rotors 34, 38 operate or spin in the same direction. However, spinning in opposite directions will result in more power being generated than when the magnet rotors 34 38 spin in the same direction.

Figure 7:
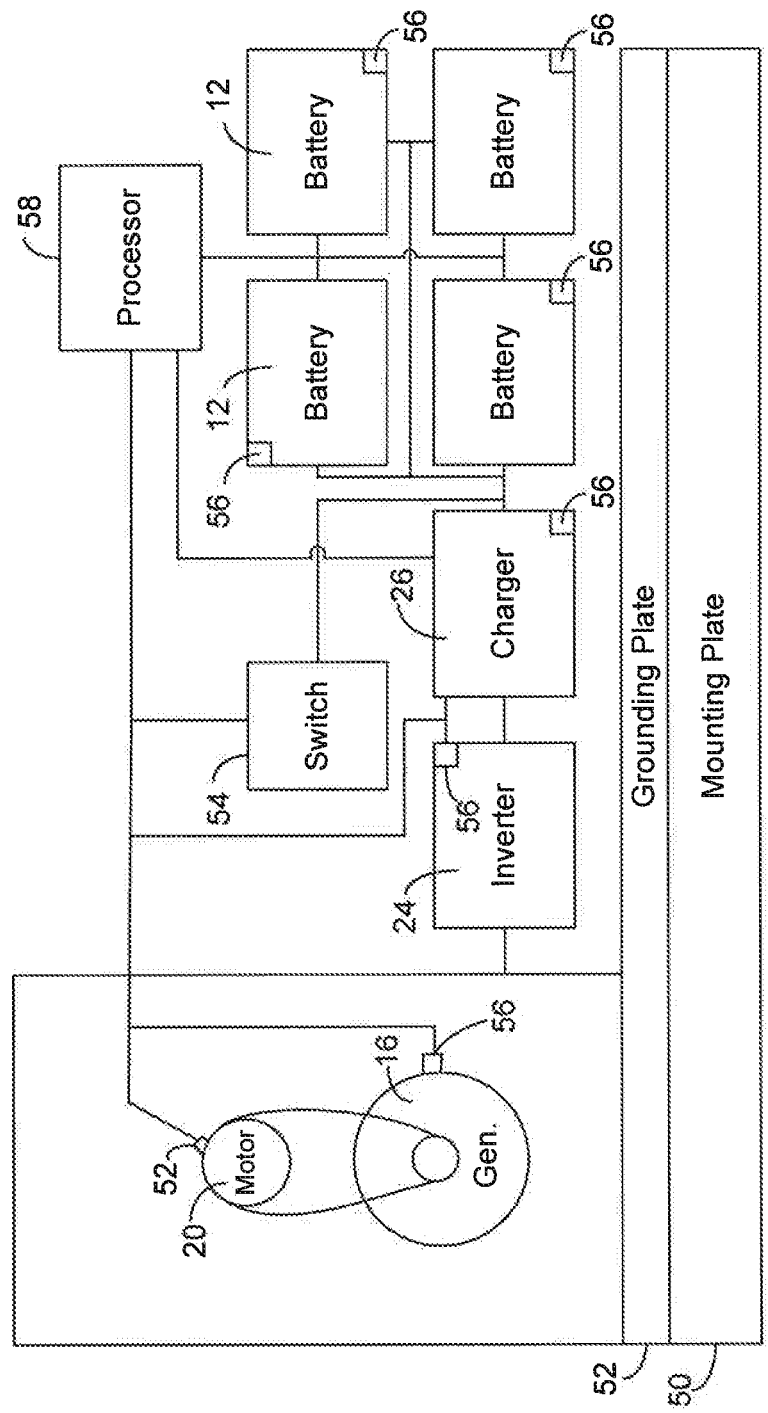
FIG. 7 discloses a block diagram of a self-generating electrical power system in a contained unit.

FIG. 7 discloses a block diagram of a generating electrical power system in a contained unit. As illustrated, all components discussed above are situated on a mounting plate 50, where the plate 50 also includes a grounding plate 52 to ground all elements. In other words, the grounding plate 52 is provided as a grounding source since the system is in a contained unit which is transportable, or movable from one location to another. Being within a contained unit, the system 5 may be moved about freely by a user to any location where the user prefers to use the system 5. Also disclosed is a switch 54, or switching device. When a plurality of batteries is used, not all batteries are necessarily required at all times. The switch 54 in conjunction with sensors 56 may be used to determine which battery 12 is used and automate switching between batteries 12 is possible to distribute the degradation of the batteries 12 across all batteries 12 more uniformly, such as by switching between which batteries are being discharged and/or discharged. The system 5 may be integrated to a processor 58 wherein a status of each battery 12 is determined based on the sensors 56, such as, but not limited to, voltage sensing sensors. The sensed voltages are provided to the processor 58 which then commands the switch 54 as to which battery 12 to include in the system 5 for producing electricity and which to exclude at a given time. In addition to regulating charging of the batteries, the processor 58 may also control the system 5. For example, if the motor 20 is operating at too high of a temperature, the processor 58 may turn off the system. Thus, sensors 56 may be provided on each element of the system 5, where information from each sensor 56 is provided to the processor 58.

Figure 8:
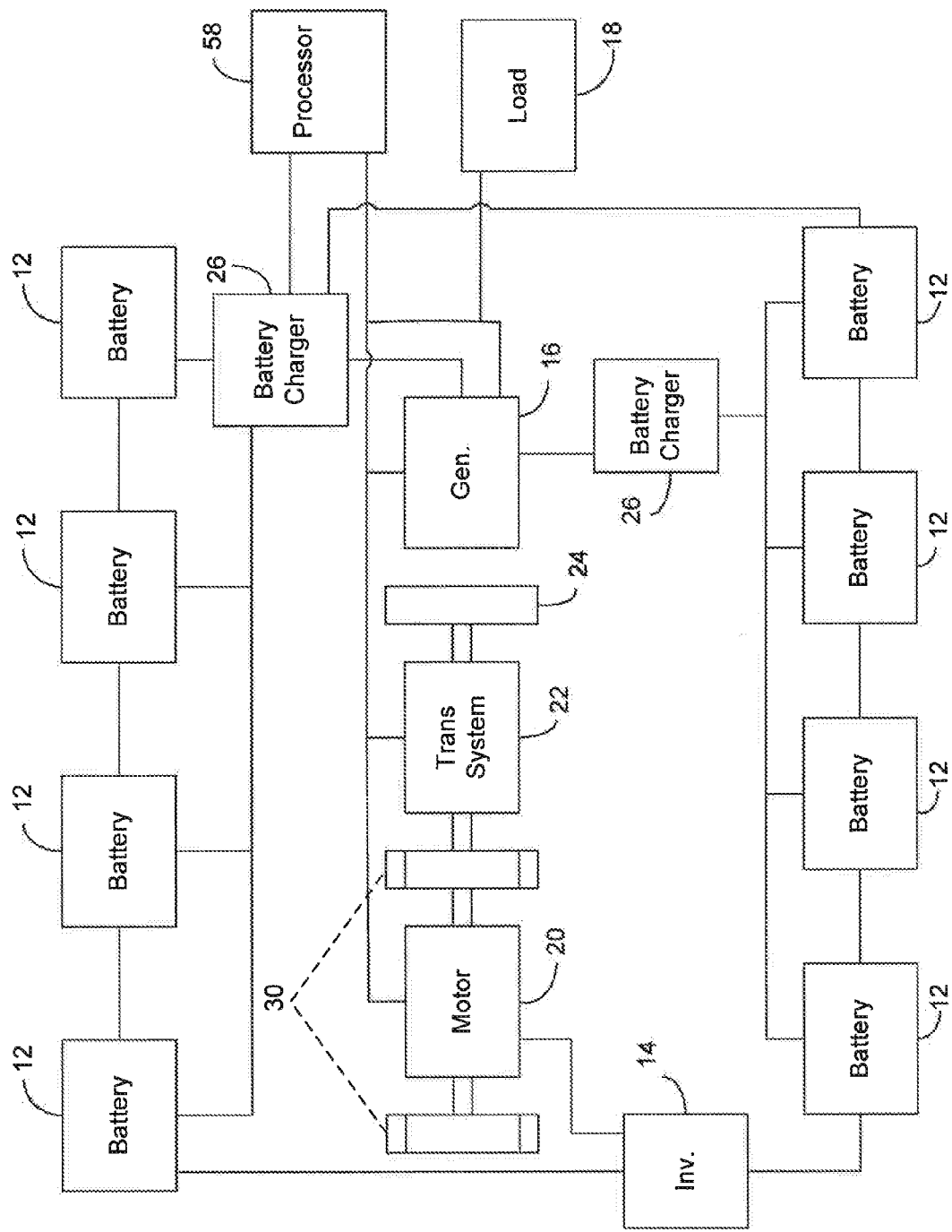
FIG. 8 discloses another block diagram of a self-generating electrical power system capable of sustaining a load.

FIG. 8 discloses another block diagram of a generating electrical power system capable of sustaining a load. As illustrated, the cooling system 30 may comprise more than one cooling fan. Furthermore, more than one battery charger 26 may be provided. For example, each battery 12 may have its own individual battery charger 26 or a defined number of batteries 12 may utilize certain battery charger 26 when more than one battery 12 is used and more than one battery charger 26 is provided, especially where the batteries 12 outnumber the battery chargers 26.

Figure 9:
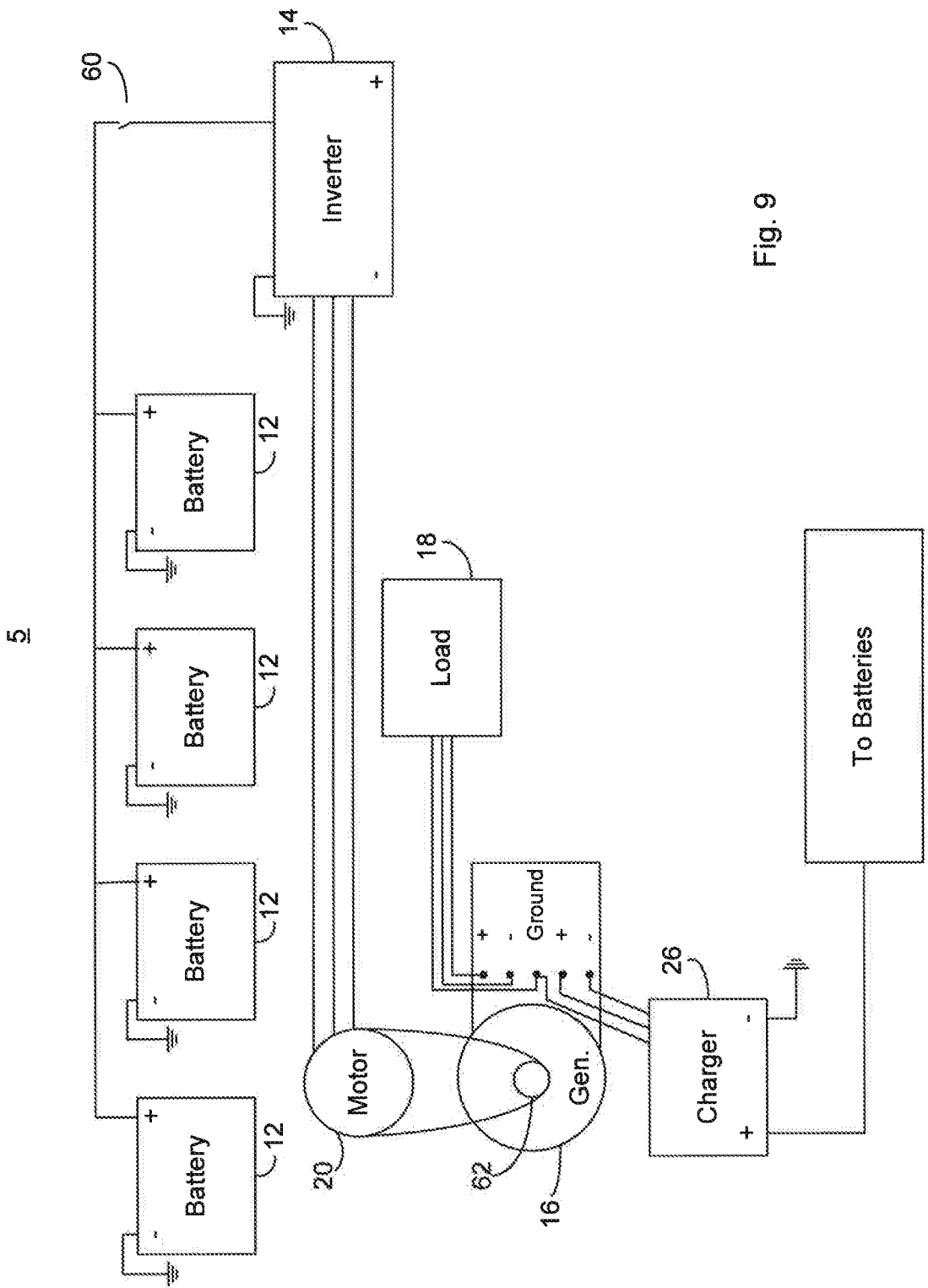
FIG. 9 discloses diagram of a self-generating electrical power system capable of sustaining a load.

FIG. 9 discloses a diagram of an electrical power system capable of sustaining a load. As illustrated, a switch device 60 is further illustrated for switching on and off when a battery 12 is within the system 5. Also illustrated is the generator 16 having an inertia weight 62. The motor 20 may drive a sheave to belt driven inertia weight. In an exemplary embodiment, the generator 16 may produce 120 volts on two legs, equaling 240 volts.

Figure 10:
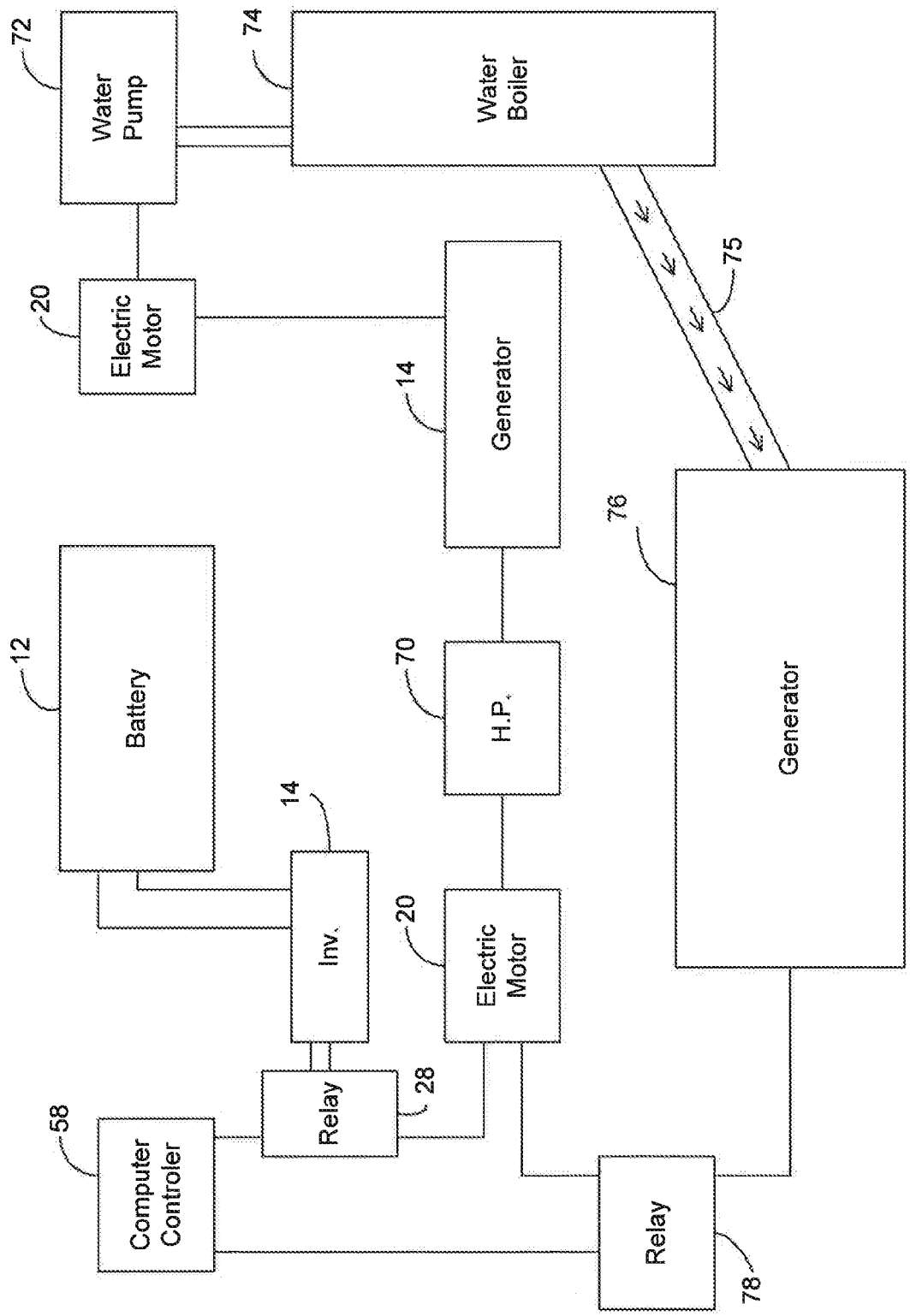
FIG. 10 discloses a diagram of the generating electrical power system used in an electric power plant and/or a desalination water plant.

FIG. 10 discloses a diagram of the generating electrical power system disclosed above used in an electric power plant and/or a desalination water plant. As illustrated, battery pack 10 provides power, via the inverter 14, to the electric motor 20. The motor spins a hydraulic pump 70, which in turn spins the generator 16 to create electricity that powers an electric water pump 72, via another electric motor 20. The water pump is connected to a water boiler 74 that produces steam 75 which power a steam generator 76. The steam generator provides power to the first electric motor 20, which results in a creation of sustainable clean energy. Also illustrated is a processor 58 or computer controller. Also illustrated are relays 78 or switching devices controllable by the processor 58. The relay is configured to shut down the system when the operational condition of the rechargeable battery 12, charger 26, electric motor 20, and/or generator 16 is at an unacceptable condition.

Though batteries are disclosed, they may be replaced with solar panels, wind turbines, and/or a conventional combustion engine generator to start to process of providing electricity to the system 5. Depending on the intended use of the system 5, the various components may be configured to power the main electric motor 20 for different environments, or configured based on specifications of the various elements.

Figure 11:
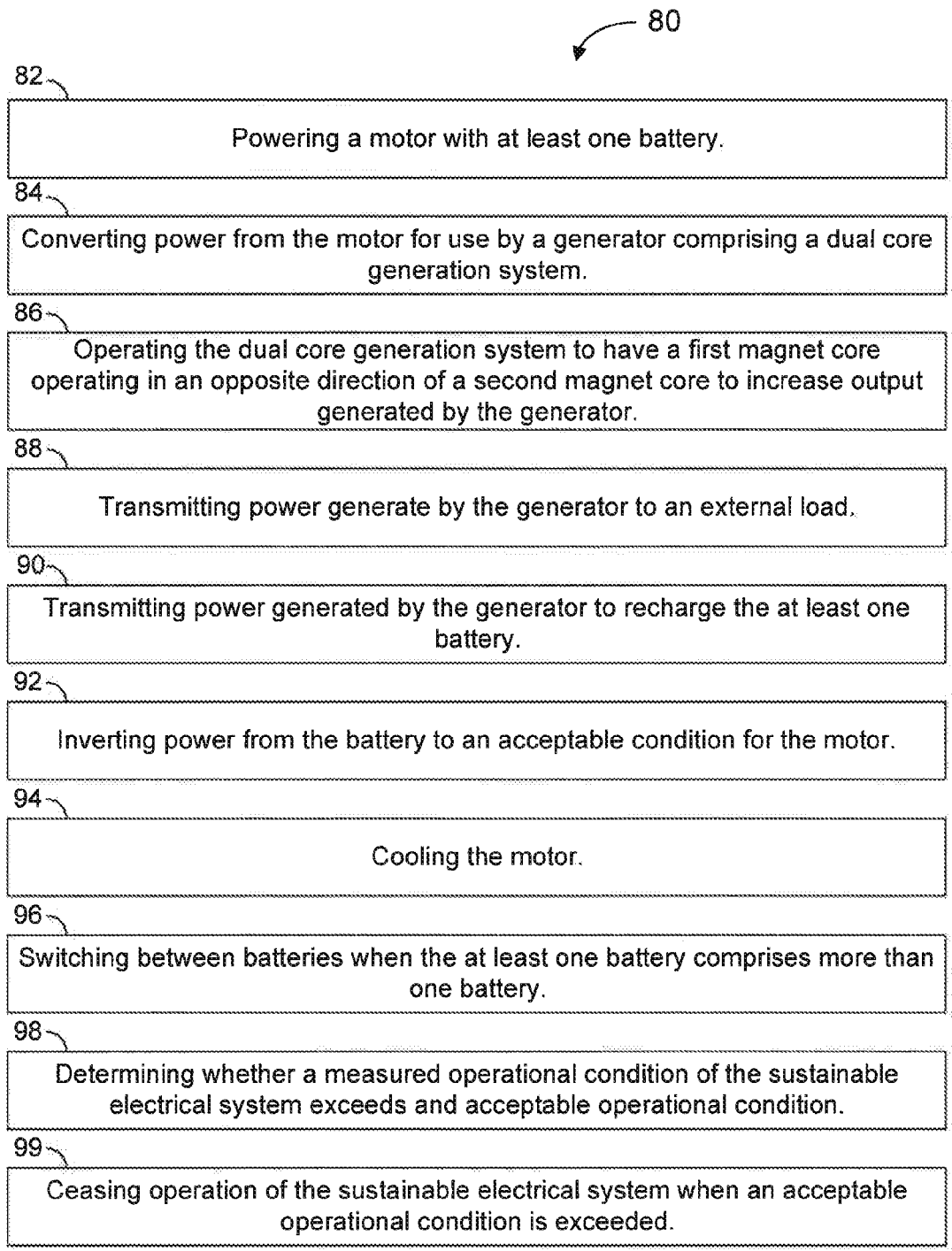
FIG. 11 discloses a flowchart illustrating an exemplary method for sustaining an electrical load with a sustainable electrical system.

FIG. 11 discloses a flowchart illustrating an exemplary method for sustaining an electrical load with a sustainable electrical system. The method 80 comprises powering a motor with at least one battery, at 82, converting power from the motor for use by a generator comprising a dual core generation system, at 84, operating the dual core generation system to have a first magnet core operating in an opposite direction of a second magnet core to increase output generated by the generator, at 86, transmitting power generated by the generator to an external load, at 88, and transmitting power generated by the generator to recharge the at least one battery, at 90. The method 80 further comprises inverting power from the battery to an acceptable condition for the motor, at 92, cooling the motor, at 94, switching between batteries when the at least one battery comprises more than one battery, at 96, determining whether a measured operational condition of the sustainable electrical system exceeds an acceptable operational condition, at 98, and ceasing operation of the sustainable electrical system when an acceptable operational condition is exceeded, at 99.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated, any use of the terms first, second, etc., does not denote any order or importance, but rather the terms first, second, etc., are used to distinguish one element from another.

What is claimed is:

1. An electrical power system comprising;
a first magnetic power generator;
a second magnetic power generator; and
a single shaft to operate the first magnetic power generator and at least the second magnetic power generator;
wherein the first magnetic power generator is partially positioned within the second magnetic power generator; and
wherein other than being operated by way of the single shaft, the first magnetic power generator and the second magnetic power generator individual power generators separate from each other.

2. The electrical power system as set forth in claim 1, wherein the first magnetic generator comprises a first core further comprising a first magnet rotor and a first stator and the second magnetic generator further comprises a second core comprising a second magnet rotor and a second stator.

3. The electrical power system as set forth in claim 2, wherein the first magnet rotor is configured to operate in one of an opposite rotational direction and a same rotational direction of the second magnet rotor as operation of both the first magnet core and second magnet core are positioned around the single shaft.

4. The electrical power system as set forth in claim 2, wherein either the first core provides redundancy to the second core or the second core provides redundancy to the first core.

5. The electrical power system as set forth in claim 4, wherein the redundancy is power redundancy.

6. The electrical power system as set forth in claim 4, wherein the first core is capable of operating if the second core fails or wherein the second core is capable of operating if the first core fails.

7. The electrical power system as claimed in claim 2, wherein the first magnetic rotor and the first stator are partially positioned within the second magnetic rotor and the second stator.

8. The system according to claim 2, wherein at least one of the first core and the at least second core is an electric motor.

9. The electrical power system as set forth in claim 1, wherein power created by the first magnetic power generator and the second magnetic power generator is sustainable clean energy.

10. An electrical power system comprising a first core comprising a first magnet rotor and a first stator and a second core comprising a second magnet rotor and a second stator with the first core partially positioned within the second core, wherein the first magnet rotor is capable of operating in either an opposite rotational direction or a same rotational direction as the second magnet rotor and wherein other than to at least one of control operation of the system and placement of system, the first magnet rotor and the second magnet rotor are separate from each other and the first stator and the second stator are separate from each other.

11. The electrical power system as set forth in claim 10, wherein the first magnet rotor is capable of rotating while the second magnet rotor is stationary.

12. The electrical power system as set forth in claim 10, wherein the second magnet rotor is capable of rotating while the first magnet rotor is stationary.

13. The electrical power system as set forth in claim 10, further comprising a single shaft configured to rotate a part of the first magnet core and a part of the second magnet core.

14. The system according to claim 13, wherein the part of the first magnet core is the first magnet rotor and the part of the second magnet core is the second magnet rotor.

15. The electrical power system as set forth in claim 10, wherein at least one of the first core and the second core is an electric motor.

16. The electrical power system as set forth in claim 10, wherein power created by the first core and the second core is sustainable clean energy.

17. The electrical power system as set forth in claim 10, wherein the first core is partially positioned within the second core.

18. An electrical power system comprising:
a first elongated magnetic power generator; and
a second elongated magnetic power generator with an opening through a center of the second magnetic power generator for placement of less than all of the first elongated magnetic power generator within the second elongated magnetic power generator;
Wherein other than to at least one of control operation of the system and placement of the system, the first elongated magnetic power generator and the second elongated magnetic power are individual power generators.

19. The electrical power system as set forth in claim 18, wherein the first magnetic generator comprises a first core further comprising a first magnet rotor and first stator and the second magnetic generator further comprises a second core further comprising a second magnet rotor and a second stator.

20. The electrical power system as set forth in claim 19, wherein at least one of the first magnet rotor operates in an opposite rotational direction and a same rotational direction of the second magnet rotor, first magnet rotor rotates while the second magnet rotor is stationary, the second magnet rotor rotates while the first magnet rotor is stationary, and either the first core provides redundancy to the second core or the second core provides redundancy to the first core.

* * * * *